US011566616B2

(12) United States Patent
Iehl et al.

(10) Patent No.: US 11,566,616 B2
(45) Date of Patent: Jan. 31, 2023

(54) PUMP SHAFT PACKING GLAND AND BUSHING

(71) Applicant: VIKING PUMP, INC., Cedar Falls, IA (US)

(72) Inventors: Victor Christian Iehl, Waterloo, IA (US); John Hall, Cedar Falls, IA (US); Michael Robert Crawford, Cedar Falls, IA (US); Chad Wunderlich, Cedar Falls, IA (US)

(73) Assignee: VIKING PUMP, INC., Cedar Falls, IA (US)

( * ) Notice: Subject to any disclaimer, the term of this patent is extended or adjusted under 35 U.S.C. 154(b) by 0 days.

(21) Appl. No.: 17/009,057

(22) Filed: Sep. 1, 2020

(65) Prior Publication Data

US 2020/0400141 A1 Dec. 24, 2020

Related U.S. Application Data

(63) Continuation-in-part of application No. 15/730,347, filed on Oct. 11, 2017, now Pat. No. 10,760,685.

(60) Provisional application No. 62/474,217, filed on Mar. 21, 2017, provisional application No. 62/406,472, filed on Oct. 11, 2016.

(51) Int. Cl.
*F04B 53/16* (2006.01)
*F16J 15/3284* (2016.01)
*F16J 15/18* (2006.01)

(52) U.S. Cl.
CPC .......... *F04B 53/164* (2013.01); *F16J 15/183* (2013.01); *F16J 15/3284* (2013.01)

(58) Field of Classification Search
CPC .......... F16J 15/18; F16J 15/182; F16J 15/183; F16J 15/184; F04B 53/164; F16C 33/74
See application file for complete search history.

(56) References Cited

U.S. PATENT DOCUMENTS

| 284,711 A | 9/1883 | Bate |
| 2,486,939 A | 11/1949 | Freund |
| 3,013,826 A | 12/1961 | Sharp |

(Continued)

FOREIGN PATENT DOCUMENTS

| CL | 33220 | 12/1982 |
| CN | 103759010 A | 4/2014 |
| JP | 2003-227570 | 8/2003 |

OTHER PUBLICATIONS

PCT International Preliminary Report on Patentability from the International Application, PCT/US/2017/056162 dated Apr. 16, 2019, 9 pages.

(Continued)

*Primary Examiner* — Nicholas L Foster
(74) *Attorney, Agent, or Firm* — Tucker Ellis LLP; Michael G. Craig; Heather M. Barnes (57) ABSTRACT

One or more techniques and/or systems are disclosed for mitigating fluid loss or leakage from a fluid pump with a rotating shaft driving a pumping mechanism. A one-piece, combined packing gland-bushing component can have an internal seal that allows for use of lubricants at higher pressures. Further, the combined packing gland-bushing component can be configured with a removal component that allows for easier removal of the packing gland-bushing component from a pump shaft, and shaft packing box.

15 Claims, 12 Drawing Sheets

(56) References Cited

U.S. PATENT DOCUMENTS

| | | | |
|---|---|---|---|
| 3,975,026 A | | 8/1976 | Boyle et al. |
| 4,440,404 A | | 4/1984 | Roach et al. |
| 4,478,423 A | | 10/1984 | Hjelsand et al. |
| 4,858,936 A | * | 8/1989 | Adams .................. F16J 15/188 |
| | | | 277/306 |
| 5,238,252 A | * | 8/1993 | Stewen .................. F16K 41/02 |
| | | | 251/214 |
| 6,382,940 B1 | | 5/2002 | Blume |
| 6,834,862 B2 | | 12/2004 | Wilkinson |
| 7,314,218 B2 | | 1/2008 | Hughes |
| 8,511,219 B2 | | 8/2013 | Tackett et al. |
| 9,188,242 B2 | | 11/2015 | Giove et al. |
| 10,072,758 B2 | | 9/2018 | Getto et al. |
| 10,760,685 B2 | * | 9/2020 | Iehl ........................ F16J 15/183 |
| 2001/0020771 A1 | | 9/2001 | Hishikawa |
| 2003/0107183 A1 | | 6/2003 | Wilkinson |
| 2005/0087935 A1 | | 4/2005 | Hughes |
| 2007/0075501 A1 | | 4/2007 | Hughes |
| 2007/0273105 A1 | | 11/2007 | Stanton et al. |
| 2010/0253007 A1 | | 10/2010 | Tackett et al. |
| 2013/0299008 A1 | | 11/2013 | Giove et al. |
| 2017/0130729 A1 | | 5/2017 | Getto et al. |
| 2018/0100583 A1 | * | 4/2018 | Iehl .................... F04C 15/0038 |
| 2018/0363779 A1 | | 12/2018 | Getto et al. |

OTHER PUBLICATIONS

PCT International Search Report and Written Opinion from the International Application, PCT/US/2017/056162 dated Jan. 15, 2018, 16 pages.

* cited by examiner

PUMP SHAFT PACKING GLAND AND BUSHING

CROSS-REFERENCE TO RELATED APPLICATIONS

This application is a continuation of U.S. patent application Ser. No. 15/730,347, entitled PUMP SHAFT PACKING GLAND AND BUSHING, filed Oct. 11, 2017, which claims priority to U.S. Provisional Patent Application Ser. No. 62/474,217, entitled SLIP FIT BUSHING WITH INTEGRAL O-RING SHAFT SEAL, filed Mar. 21, 2017, and claims priority to U.S. Provisional Patent Application Ser. No. 62/406,472, entitled FLOATING BUSHING AND PACKING GLAND, filed Oct. 11, 2016; and, all of which are incorporated herein by reference.

BACKGROUND

Fluid pumps used in a variety of settings often utilize a packing seal system, which can comprise packing material and a packing gland, to mitigate loss of the transported fluid from the fluid transport system. These sealing systems are typically implemented along a rotating shaft used to drive the pumping component. For example, packing material can be compressed against a back seat, on a rotating shaft, by the packing gland and follower components. Often, a separate bushing component may be disposed on the shaft, between the packing gland and packing material. In this way, for example, the compressed packing material, along with a pressurized lubricant and bushing, can help mitigate fluid loss along the shaft.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein can be utilized to help mitigate fluid loss or leakage from a fluid pump with a rotating shaft driving a pumping mechanism, such as in a gear pump, for example. In one implementation, a packing gland component and bushing component may be formed as a one-piece, packing gland-bushing component, instead of typical two-piece components. In this example, the packing gland-bushing component can have an internal seal that allows for use of lubricants at higher pressures. Further, in this implementation, a face of the packing gland portion may have removal components that allows for easier removal of the packing gland-bushing component from a pump shaft.

As another example, the one-piece packing gland-bushing may be configured to be used without packing material, essentially comprising merely a bushing component. In this example, the packing gland-bushing component may have a slip-fit configuration with the shaft of the pump. For example, a plurality of O-rings may be used to provide a seal, and allow for pressurized lubricant to be introduced along the bushing portion, at higher pressures. In some configurations, this may allow for the elimination of packing material in the shaft seal.

In one implementation of a system for sealing a pump shaft, a one-piece, combination packing gland and bushing component can be used to seat in a shaft casing along a rotating pump shaft. In this implementation, the packing gland and bushing component can comprise a proximal end that is situated on the shaft near a pump motor coupler portion of the shaft, and a distal end that is situated distally on the shaft from the pump motor coupler. The packing gland and bushing component can further comprise a packing gland portion at the proximal end to provide for compression of packing material in the shaft casing. Additionally, the packing gland and bushing component can comprise a bushing portion at the distal end in order to provide a bearing surface for the rotating shaft. In this implementation, the bushing portion can comprise an inner gasket channel that is disposed proximate a proximal end of the bushing portion. The inner gasket channel can be used hold a gasket between the inside of the bushing portion and the rotating shaft to mitigate leakage of a lubricant from the proximal end of the inside of the bushing portion. In this implementation, a packing material can be disposed proximate the distal end of the packing gland and bushing component to mitigate leakage of a fluid from a pumping chamber. The packing material can be subjected to compression force that is provided by the packing gland and bushing component.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As an example, pumps can be coupled to a motor by a rotating shaft. The motor typically rotates the shaft, which, in turn, rotates a pump rotor to move the fluids through coupled conduits. However, the location at which the rotating pump shaft enters the pumping chamber, comprising the pump rotor, offers a location for leakage of the pumped fluid from the pump chamber. A system can be devised for sealing a rotating pump shaft entrance to the pumping chamber. In one implementation, the pump can comprise a pump shaft casing, or pump shaft packing box, or the like, disposed proximally (e.g., proximally in relation to the connection of the shaft to the motor) from the entrance of the pump shaft to the pump chamber. In this implementation, the pump shaft is disposed inside the pump shaft casing, or pump shaft packing box, etc.

FIGS. 1-5 illustrate one implementation of an example system for sealing a rotating pump shaft in a pump. FIG. 1A illustrates an example pump 50, in an elevation, rear view from the pump's motor toward the pump rotor. FIG. 1B illustrates one implementation of a system 100, showing the example pump 50 in a top a cut-away view, along the A-A line of FIG. 1A. FIG. 1C illustrates one implementation of a system 100, showing the example pump 50 in a close up of a portion of the top a cut-away view of FIG. 1B. In this implementation, a one-piece, combination packing gland and bushing component 102 can be used to seat in a shaft casing 150 along a rotating pump shaft 152. In this implementation, the packing gland and bushing component 102 can comprise a proximal end 104 that is proximate a pump motor coupling portion 162 of the shaft 152. Further, the packing gland and bushing component 102 can comprise a distal end 106 that is distal from the pump motor coupling portion 162 of the shaft 152.

Figures 1A, 1B:
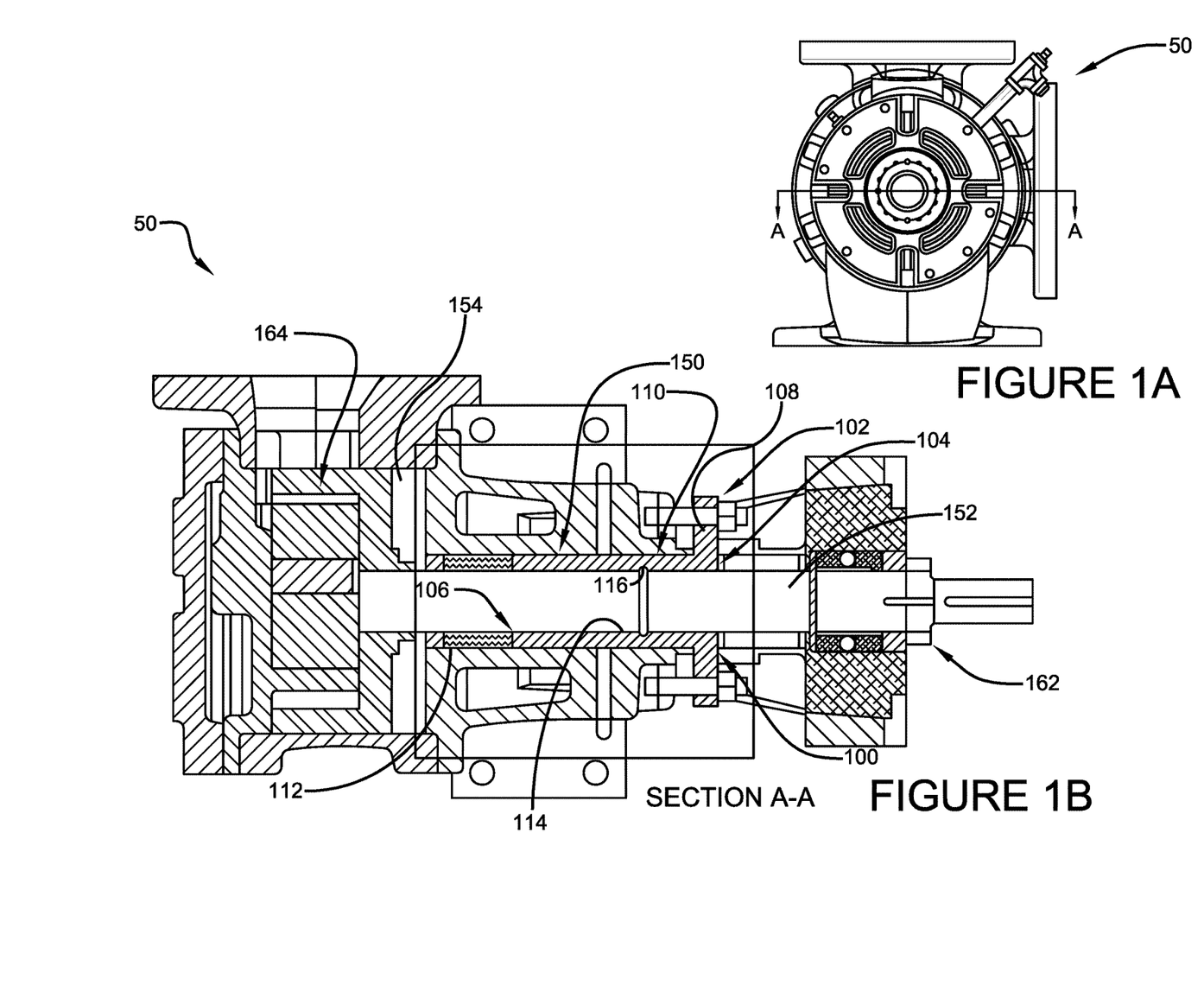
FIG. 1A is a component diagram illustrating a view of an example implementation of a pump where one or more portion of one or more systems described herein may be implemented.
FIGS. 1B and 1C are a component diagrams illustrating a cut-away view of an example implementation of a pump where an example system 100, described herein, may be implemented.
Figure 1C:
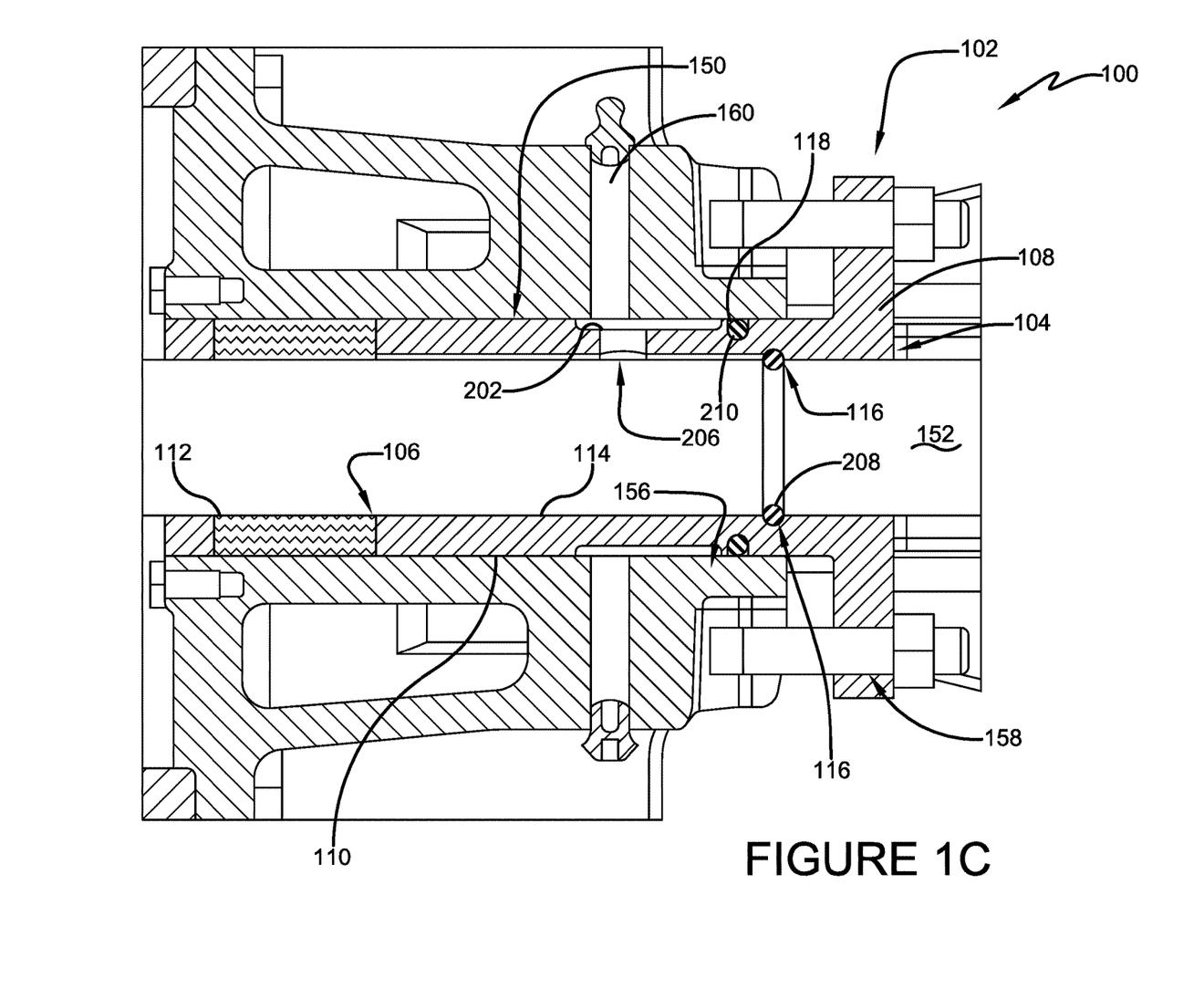

Additionally, in this implementation, the packing gland and bushing component 102 can comprise a packing gland portion 108 disposed at the proximal end 104. The packing gland portion 108 can provide for compression of packing material in the shaft casing 150. The packing gland and bushing component 102 can also comprise a bushing portion 110 that is disposed at the distal end 106. The bushing portion 110 can provide a bearing surface 114 for the rotating shaft 152. In this implementation, the bushing portion can comprise an inner gasket channel 116 that is disposed proximate a proximal end of the bushing portion 110. The inner gasket channel 116 can be used to hold a gasket between the inside of the bushing portion 110 and the rotating shaft 152 to mitigate leakage of a lubricant from the proximal end 104, from the inside of the bushing portion 110.

Figure 3A:
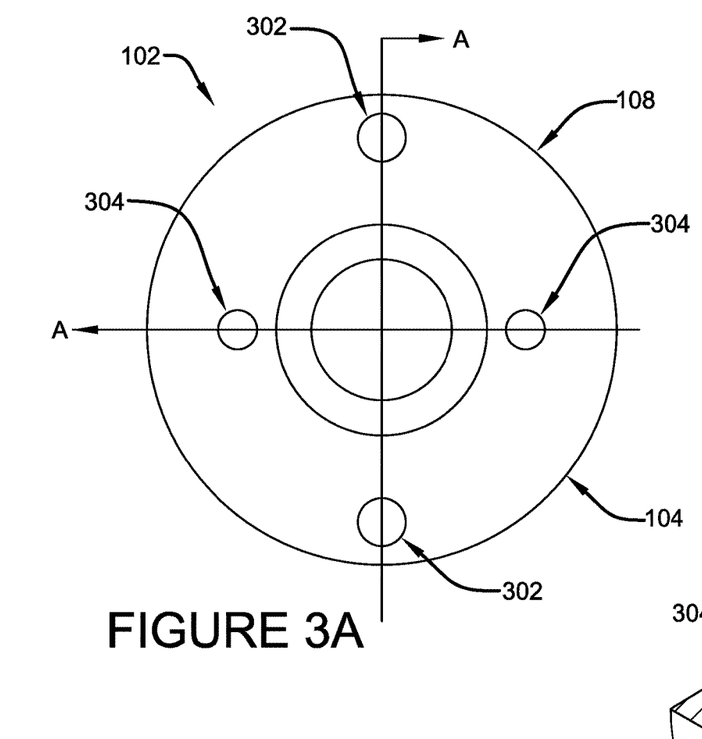
FIGS. 3A and 3B are component diagrams illustrating various views of one or more portions of one or more systems described herein.
Figure 3B:
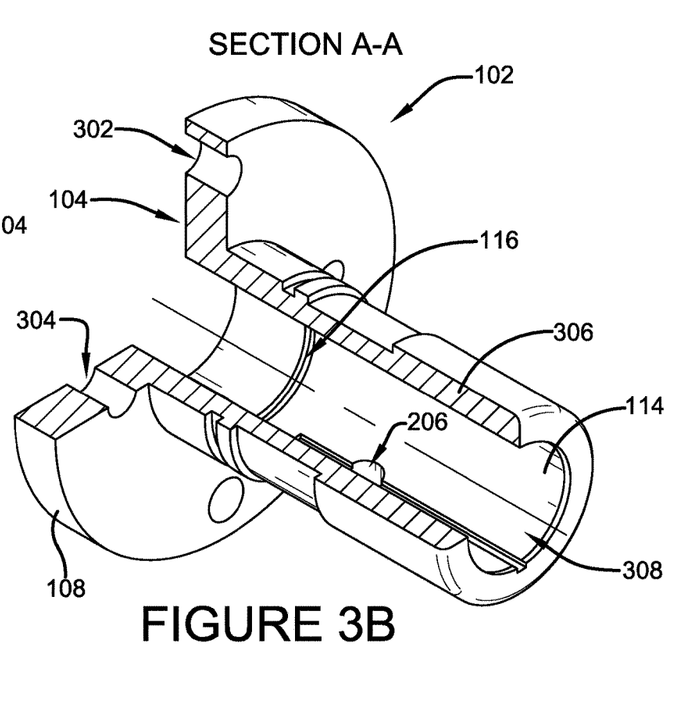

As illustrated in FIGS. 1B and 1C, the example system 100 can comprise packing material 112 that is disposed proximate the distal end 106 of the packing gland and bushing component 102. The packing material 112 can be used to mitigate leakage of a fluid from a pumping chamber 154. Further, in this implementation, the packing material 112 can be subjected to compression force provided by the packing gland and bushing component 102. As illustrated in FIGS. 3A and 3B, with continued reference to FIGS. 1B and 1C, in one implementation, the gland portion 104, of the packing gland and bushing component 102, can comprise two fastener couplers 302. In this implementation, the fastener couplers 302 can respectively be configured to receive a compression fastener 158 to facilitate compression of the packing material (e.g., against a packing retainer or rear seat of a packing chamber or shaft casing), such as by using the packing gland and bushing component 102. In one implementation, the pump can comprise a packing retainer, which may be removable from the pump rotor side of the shaft casing or packing chamber. In this way, for example, the packing material 112 may be removed (e.g., and replaced) without removal of the packing gland and bushing component 102.

As an example, the combination packing gland and bushing component 102 may be used to replace current two-piece bushing and packing gland systems in the shaft casing of a fluid pump. For example, two-piece packing gland systems, which are often made of two different materials, can be more difficult to remove from the shaft casing, for maintenance, and/or replacement of packing material. That is, using the example system 100, both the packing gland and bushing portions 108, 110 can be removed at the same time; and a one-piece, combination packing gland and bushing component 102 can be easier and less costly to manufacture in a single unit (e.g., machined, formed, etc.). Whereas current and prior two-piece systems have two separate pieces that are manufactured separately (e.g., and sometimes using different materials), and may need to be removed separately. Further, for example, the location of the inner gasket channel 116, with an accompanying gasket (e.g., O-ring), may allow for higher pressures of shaft lubricant pressure without causing typical lip seal failure of bushing found in current two-piece systems.

Figure 2A:
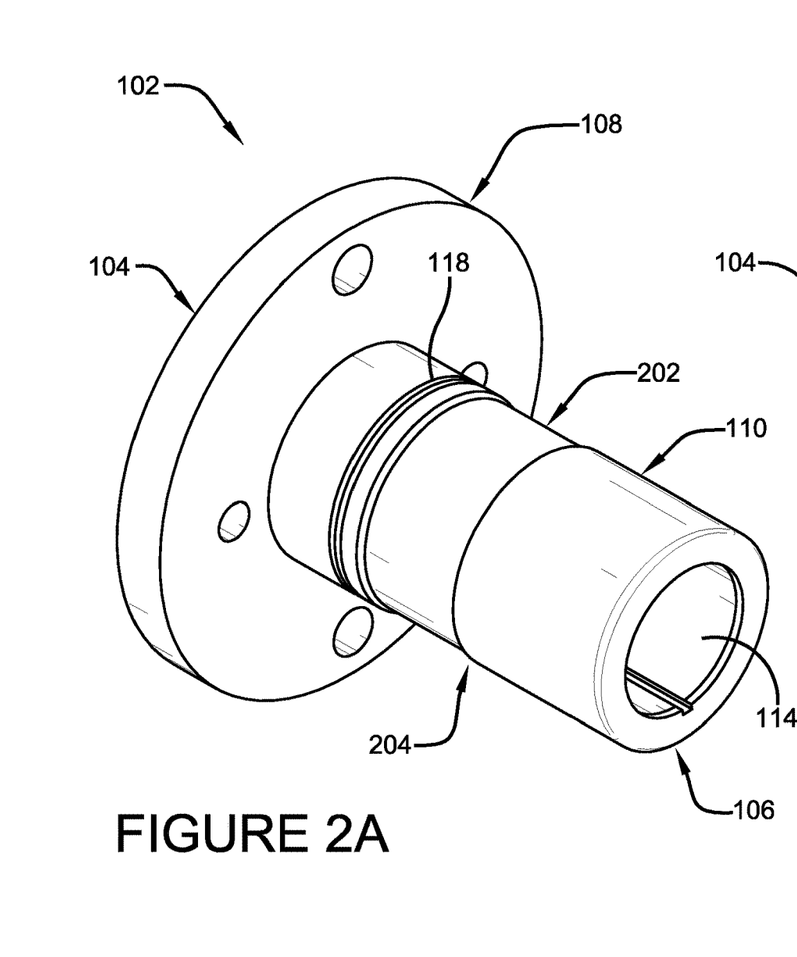
FIGS. 2A and 2B are component diagrams illustrating various views of one or more portions of one or more systems described herein.
Figure 2B:
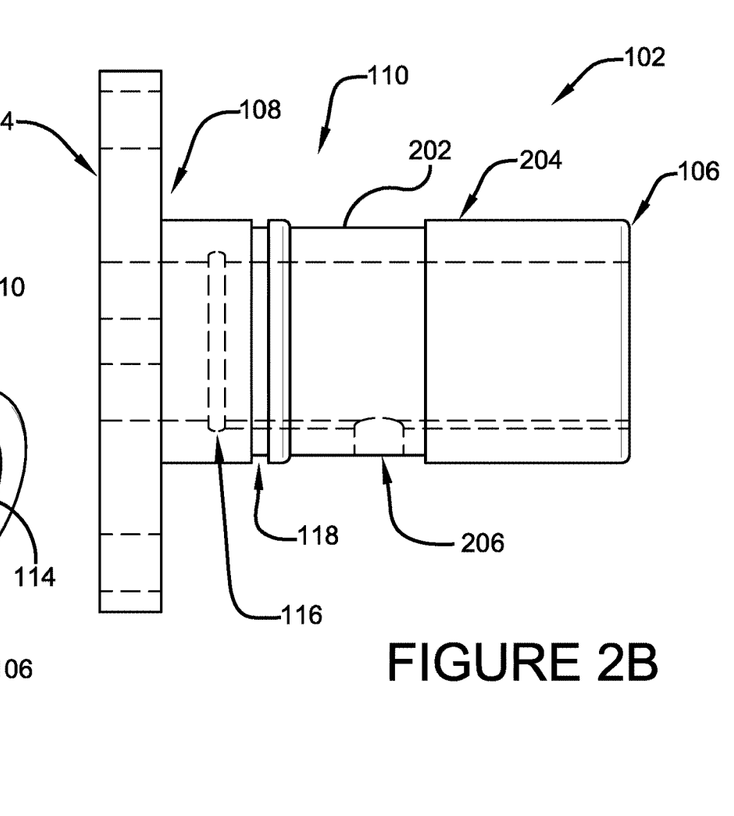

FIGS. 2A, 2B, 3A, 3B, 4, 5A, 5B, and 5C illustrate various views of one or more implementations of one or more portion of the example system 100, as may be utilized in an example pump 50. In one implementation, the packing gland and bushing component 102 can comprise an outer gasket channel 118 that is disposed proximate the proximal end 102 of the bushing portion 110. In this implementation, the outer gasket channel 118 can be used to hold an outer gasket 210 between the outside of the bushing portion 110 and a wall of the shaft casing 156. As an example, the outer gasket channel 118 with the outer gasket 210 can help mitigate leakage of lubricant (e.g., and/or pumped fluid)

from the proximal end 104 of the packing gland and bushing component 102, around the external surface 204 of the bushing portion 110.

In one implementation, as illustrated in FIGS. 2A and 2B, the packing gland and bushing component can comprise a lubricant channel 202 that is disposed around the external surface 204 of the bushing portion 110, distally on the bushing portion 110 from the inner gasket channel 116. The lubricant channel 202 can be configured to operably receive bushing lubricant 160, such as provided by a lubricant source (e.g., injector). Further, in this implementation, the packing gland and bushing component 102 can comprise a lubricant port 206 that is disposed through a wall 306 of the bushing portion 110, between the lubricant channel 202 and the interior of the bushing 308. The lubricant port 206 can be configured to operably transport lubricant 160 from the lubricant channel 202 to the interior of the bushing portion 308.

As one example, the pump (e.g., 50) may comprise a lubricant provider, such as lubrication pump, injector, or the like, that provides a lubricant source. In this example, the lubricant source can be fluidly coupled with a port located in the wall 156 of the shaft casing 150. Further, in this example, the port located in the wall 156 of the shaft casing 150 may be aligned with the lubrication channel 202, thereby providing a source of lubricant to the lubrication channel 202. Additionally, the lubrication port 206 can provide a fluid channel for the lubricant between the lubrication channel 202 and the interior of the bushing portion 308. In this way, for example, the bearing surface 114 of the bushing portion 110 can be provided with lubrication, at least while the shaft 152 is operably rotating during operation of the pump 50.

As one example, a location of the outer gasket channel 118, used with an accompanying gasket 210, can mitigate leakage of the lubricant to the proximal end 104 of the packing gland and bushing component 102, along its outer surface 204. Further, in this example, the location of the inner gasket channel 116, used with an accompanying inner gasket 208, can mitigate leakage of the lubricant to the proximal end 104 of the packing gland and bushing component 102, along its inner surface (e.g., the bearing surface 114). Additionally, the location of these gaskets 208, 218, in combination with the one-piece combination of the packing gland and bushing component 102 may allow for lubricant to be used at a higher pressure than prior. In this way, leakage of the pumped fluid from the pumping chamber 154 may also be mitigated by using higher lubricant pressures. As one example, the location of the gasket channel 116 and inner gasket 208 can provide a dynamic seal against the shaft 152. In this example, lubricant provided to the interior of the bushing portion 308 can help cool and lubricate the gasket 208. The gasket channel 116 and inner gasket 208 can also serve as a secondary containment to mitigate leakage from the pumping chamber 154, for example, if the packing material 112 would fail.

Figure 4:
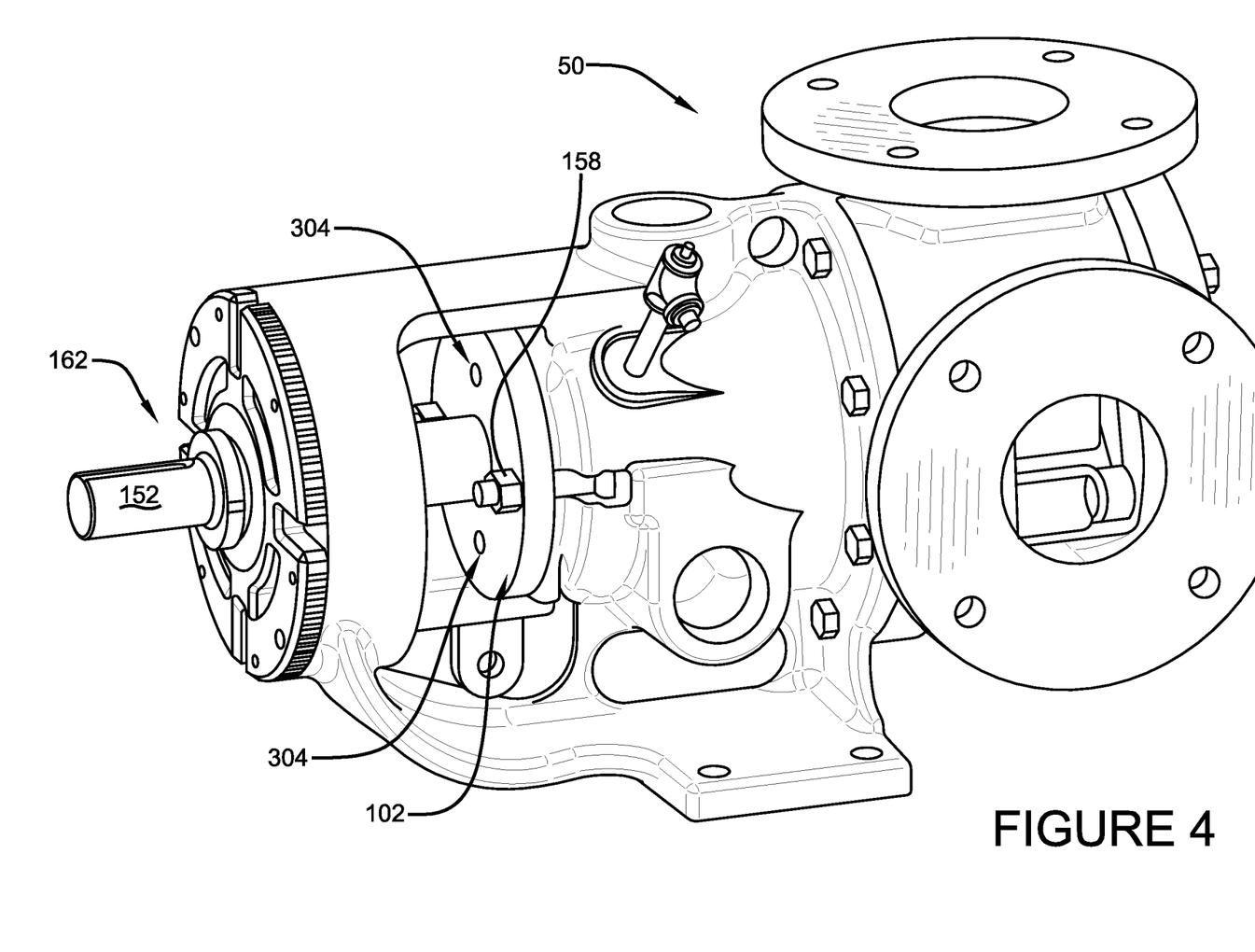
FIG. 4 is a component diagram illustrating a view of an example implementation of a pump where one or more portion of one or more systems described herein may be implemented.
Figure 5A:
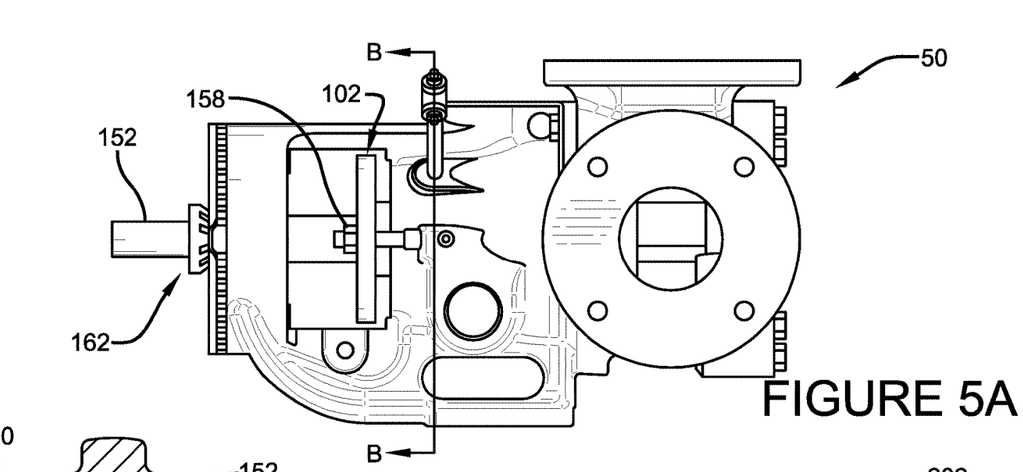
FIG. 5A is a component diagram illustrating a view of an example implementation of a pump where one or more portion of one or more systems described herein may be implemented.
Figure 5B:
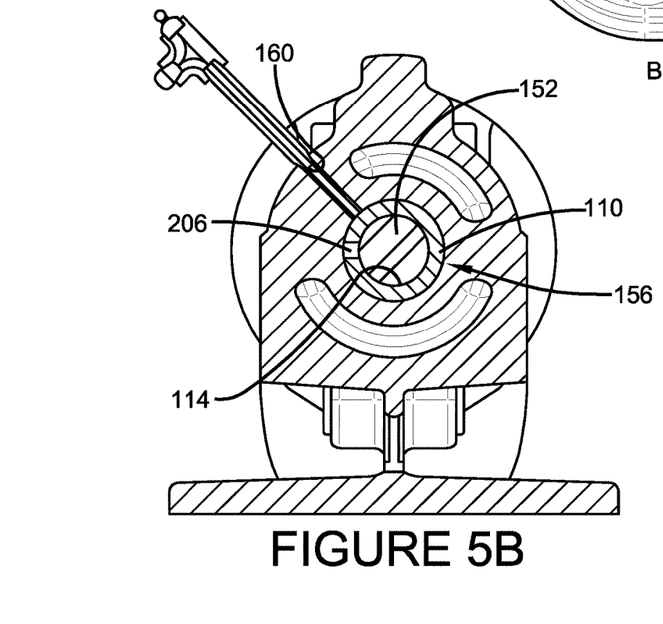
FIGS. 5B and 5C are a component diagrams illustrating a cut-away view of an example implementation of a pump where an example system 100, described herein, may be implemented.
Figure 5C:
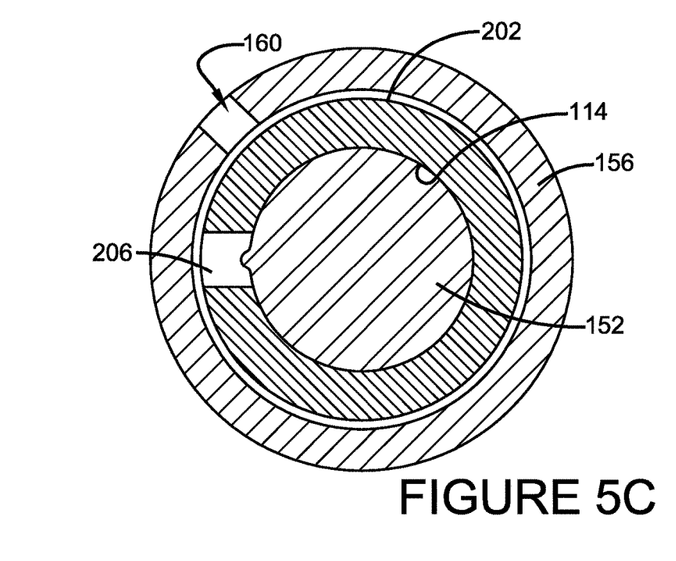

In one implementation, as illustrated in FIGS. 3A, 3B, and 4, the packing gland and bushing component 102 can comprise a packing gland and bushing removal component 304. In one implementation, the packing gland and bushing removal component 304 can be disposed on the packing gland portion 108 to facilitate removal of the packing gland and bushing component 102 from the pump shaft casing 150. As an example, the packing gland and bushing removal component 304 can comprise an access opening that allows a pulling tool to engage with the packing gland portion 108, to pull the packing gland and bushing component 102 from the pump shaft casing 150.

In one implementation, the packing gland and bushing removal component 304 can comprise a threaded portion to further facilitate removal of the packing gland and bushing component 102. For example, the access opening of the packing gland and bushing removal component 304 may comprise internal threads that allows for engagement with an external threaded component. In one example, jack screws may be threaded into the packing gland and bushing removal component 304 to facilitate in removal. As another example, a pulling tool can be coupled with the jack screws to provide for easy removal of the packing gland and bushing component 102.

In one aspect, a device may be devised that can be used for sealing a pump shaft of a pump. FIGS. 6-11 illustrate one or more portions of an example device 600, in this aspect, and one or more implementations of the example device 600 as used in an example pump 854. In one implementation, as illustrated in FIGS. 6-10, the example device 600 can comprise a tubular portion 602. The tubular portion 602 can comprise a distal end 604 that may be disposed adjacent a back seat 1052 of a pump shaft packing box 950. Further, in this implementation, the example device 600 can comprise a proximal end 606 that may be disposed adjacent a proximal end 952 of the pump shaft packing box 950. That is, for example, the length of the tubular portion 602 can be configured to fit (e.g., and fill entirely) the length of the pump shaft packing box 950.

Figure 7:
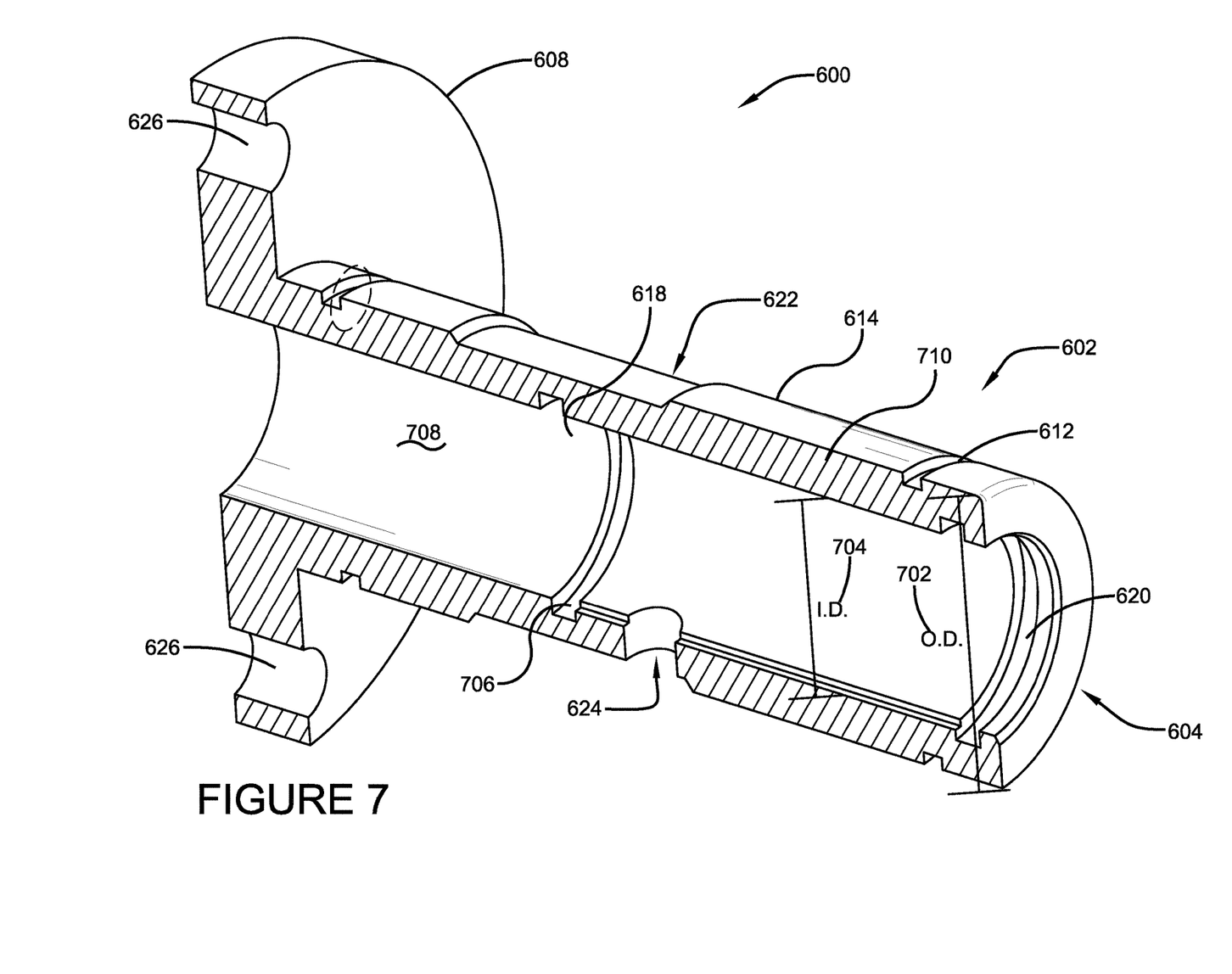
FIG. 7 is a component diagram illustrating a perspective cut-away view of an example device 600 used to facilitate providing a seal in a pump.
Figure 9:
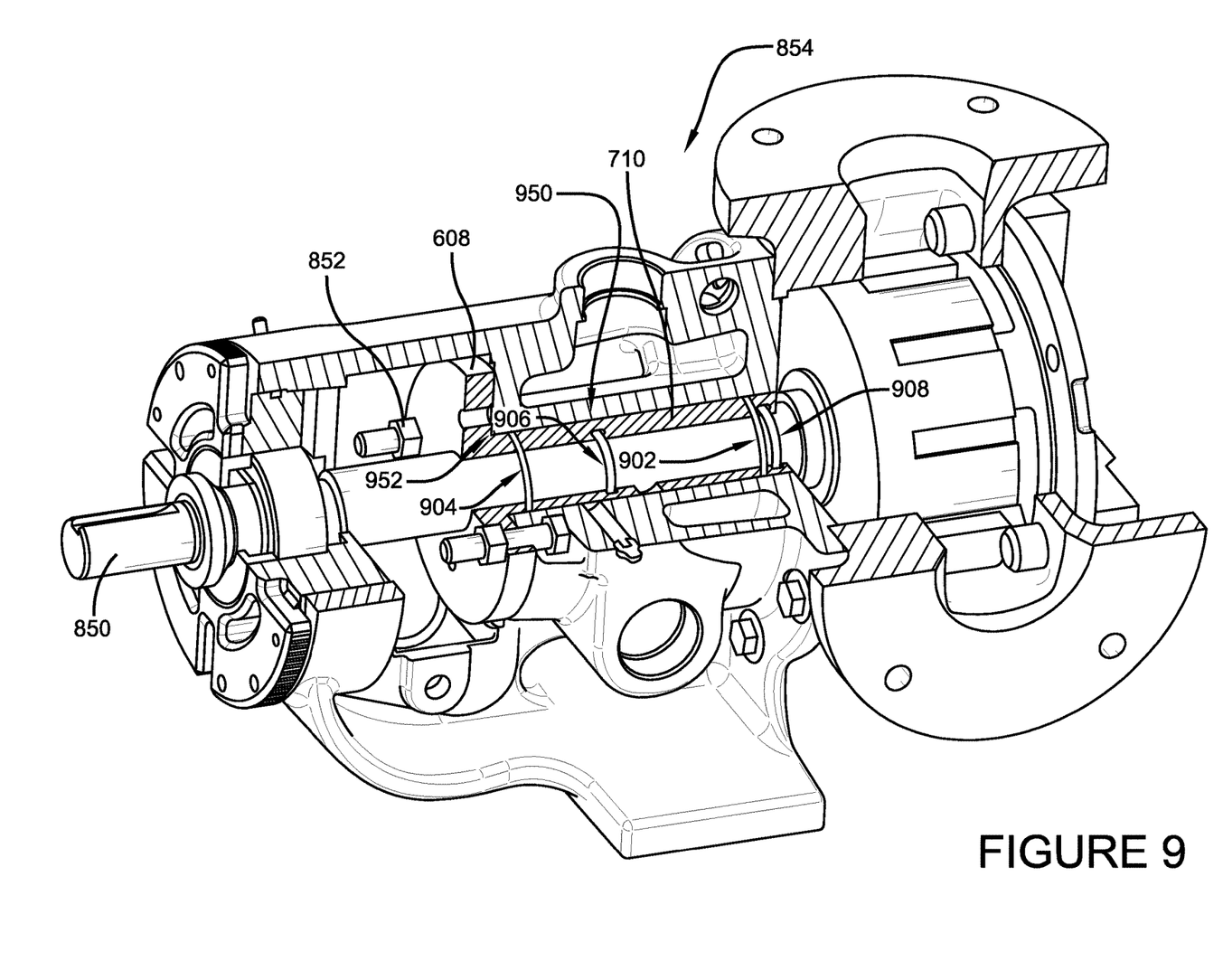
FIG. 9 is a component diagram illustrating a cut-away view of an example implementation of a pump where one or more portion of one or more devices described herein may be implemented.

In this implementation, tubular portion 602 can comprise an external diameter 702 that is sized to fit inside the pump shaft packing box 950, and an internal diameter 704 that is sized to receive a pump shaft 850. That is, for example, the tubular portion 602 can be configured to fit over the pump shaft 850, and to fit inside (e.g., and fill) the pump shaft packing box 950, such as in a slip-fit arrangement. In this way, for example, packing material may not be needed.

Figure 6:
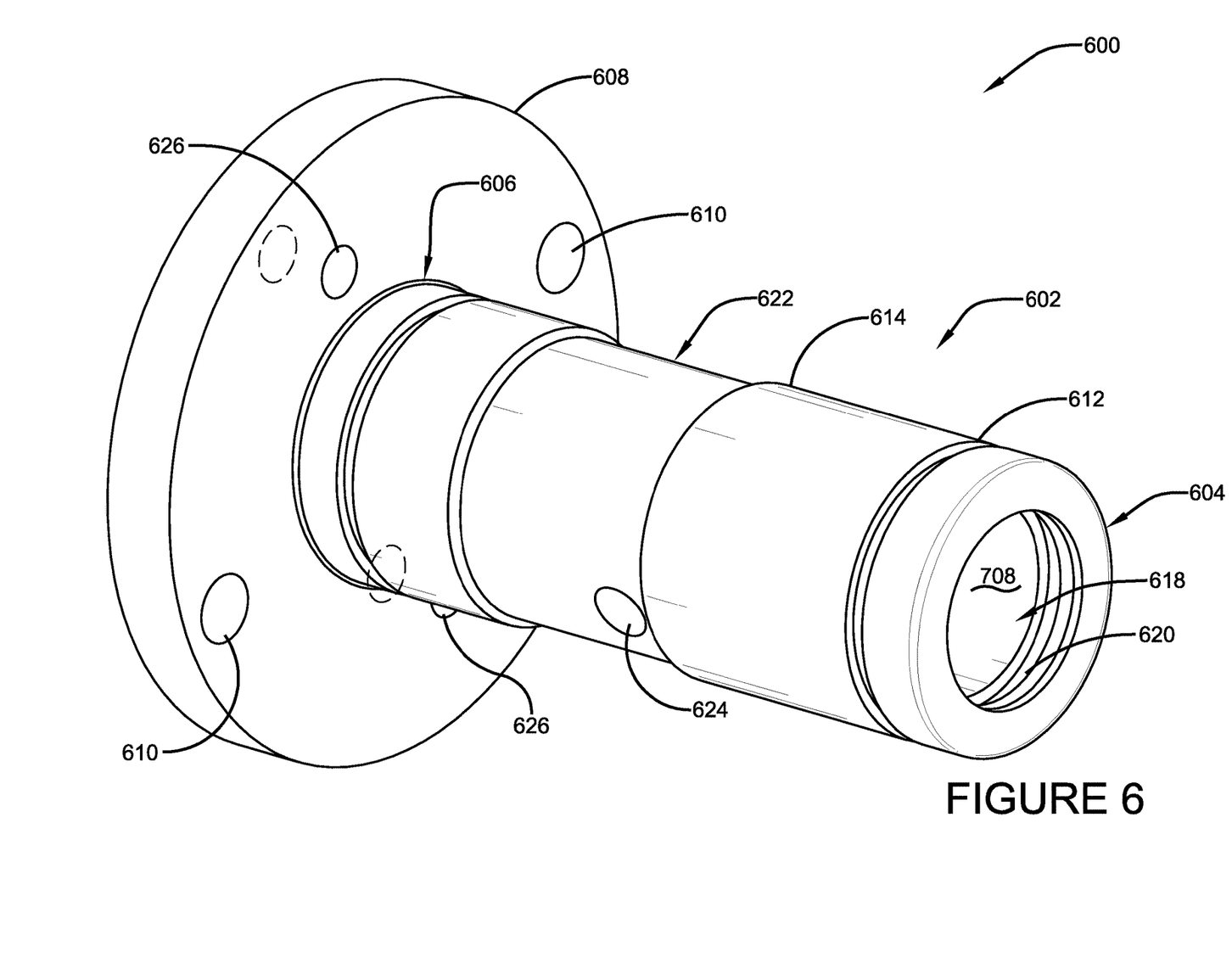
FIG. 6 is a component diagram illustrating a perspective view of an example device 600 used to facilitate providing a seal in a pump.
Figure 8:
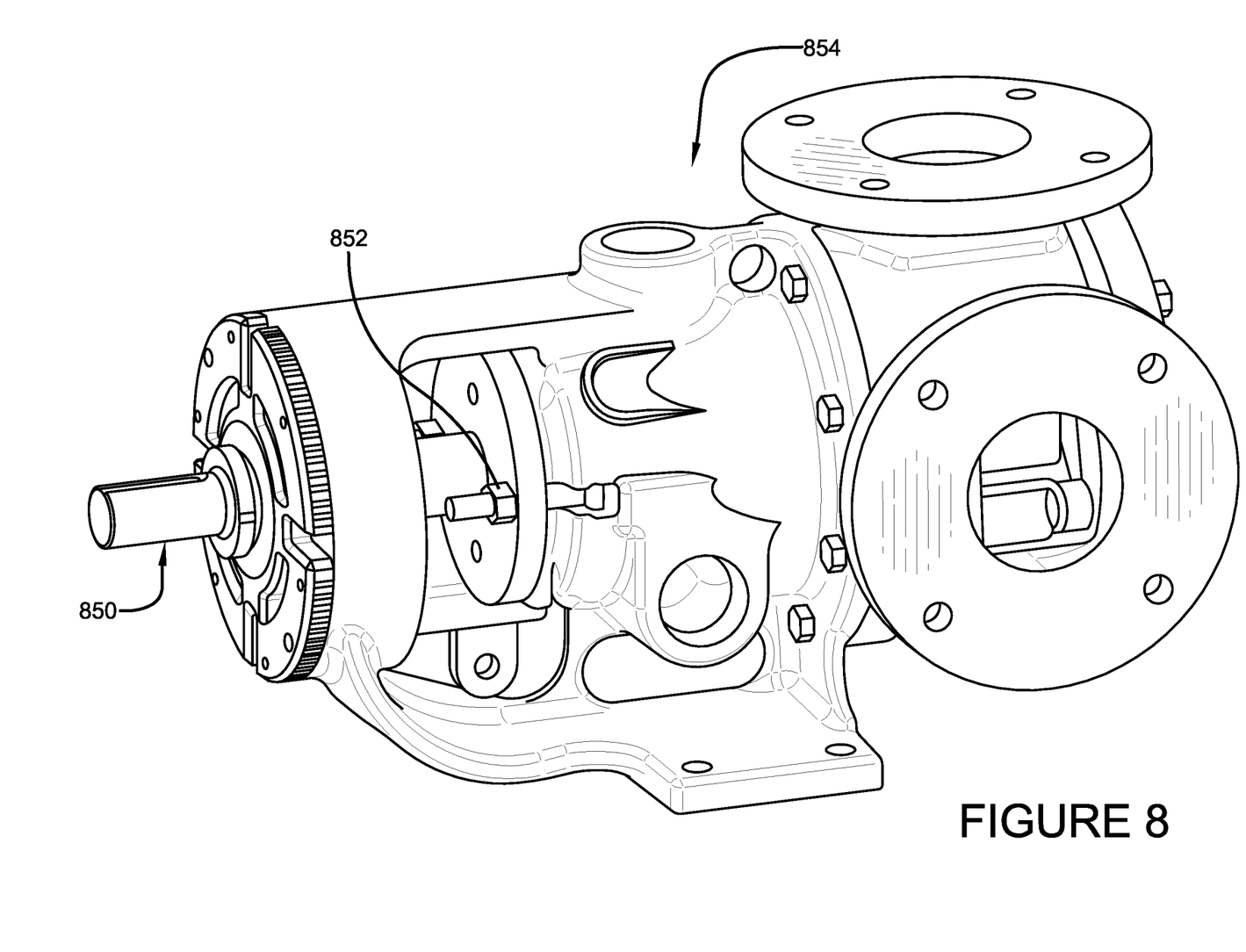
FIG. 8 is a component diagram illustrating a view of an example implementation of a pump where one or more portion of one or more devices described herein may be implemented.

The example device 600 can comprise a flange 608 that is disposed at the proximal end 606 of the tubular portion 602. In this implementation, the flange can comprise two fastener couplers 610, that are respectively configured to receive a fastener 852 (e.g., a compression fastener, such as 158 of FIG. 1). Further, the example device 600 can comprise a first gasket channel 612 that is configured to receive a gasket. The first gasket channel 612 can be disposed around the external surface 614 of tubular portion 602, proximate to the distal end 604. Additionally, the example device 600 can comprise a second gasket channel 616 that is configured to receive a gasket. The second gasket channel 616 can be disposed around the external surface 614 of tubular portion 602 proximate to the proximal end 606. The example device 600 can also comprise a third gasket channel 706 that is configured to receive a gasket. The third gasket channel 706 can be disposed around the internal surface 618 of tubular portion 602, between the first gasket channel 612 and the second gasket channel 616.

In one implementation, the example device 600 can comprise a fourth gasket channel 620 that is configured to receive a gasket. The fourth gasket channel 620 can be disposed around the internal surface 618 of tubular portion 602, proximate to the distal end 604. Further, in one implementation, the fourth gasket channel 620 can be disposed between the first gasket channel 612 and the distal end 604 of the tubular portion 602. In one implementation, a plurality of O-rings 902, 904, 906, 908 may be used as gaskets, to provide a slip-fit for the tubular portion on the pump shaft 850 in the pump shaft packing box 950. In this implementation, the plurality of O-rings can comprise a first O-ring 902 disposed in the first gasket channel 612; a second O-ring 904 disposed in the second gasket channel 616; and a third O-ring 906 disposed in the third gasket channel 706. Additionally, a fourth O-ring 908 can be disposed in the fourth gasket channel 620.

Figure 10:
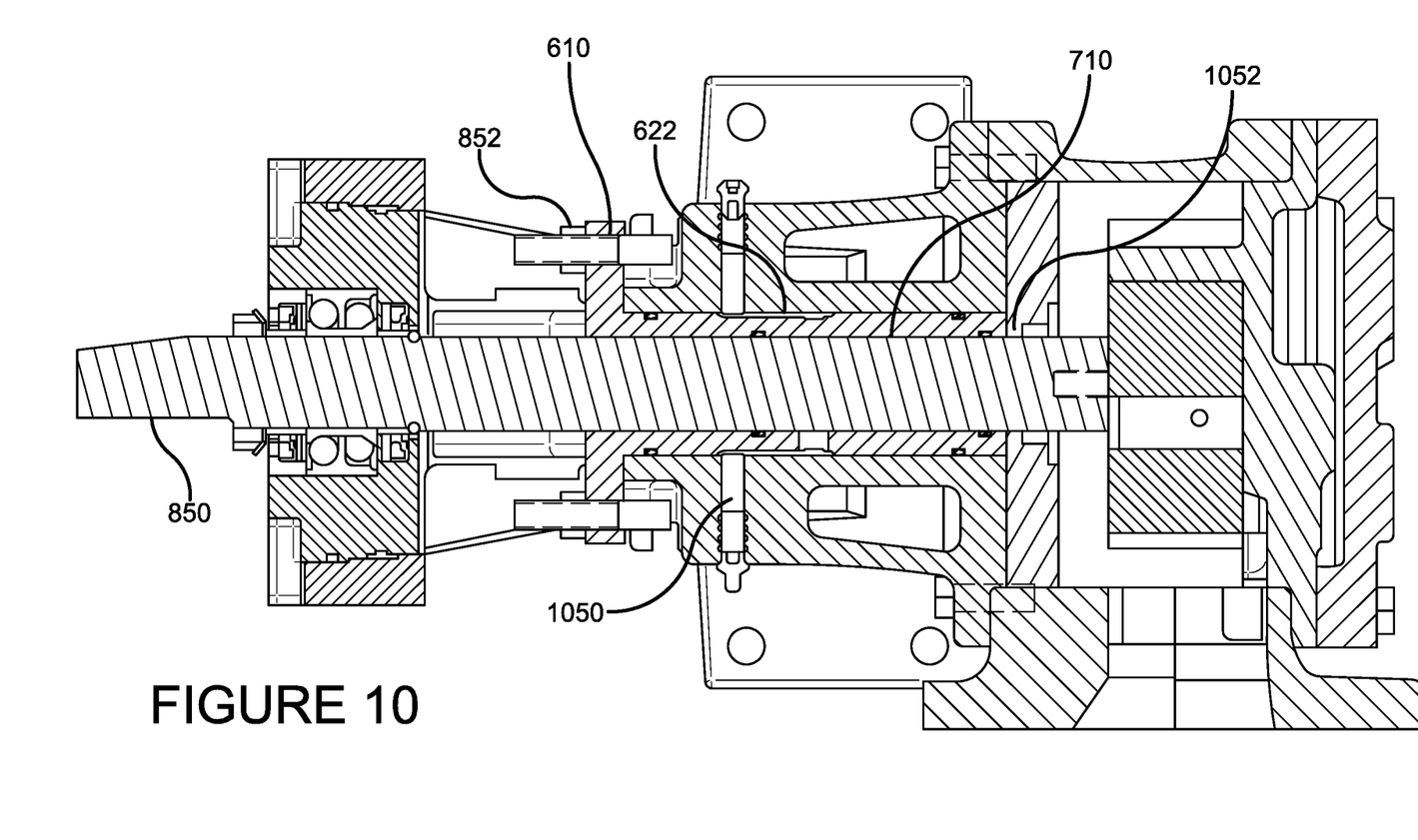
FIG. 10 is a component diagram illustrating a cut-away view of an example implementation of a pump where one or more portion of one or more devices described herein may be implemented.
Figure 11:
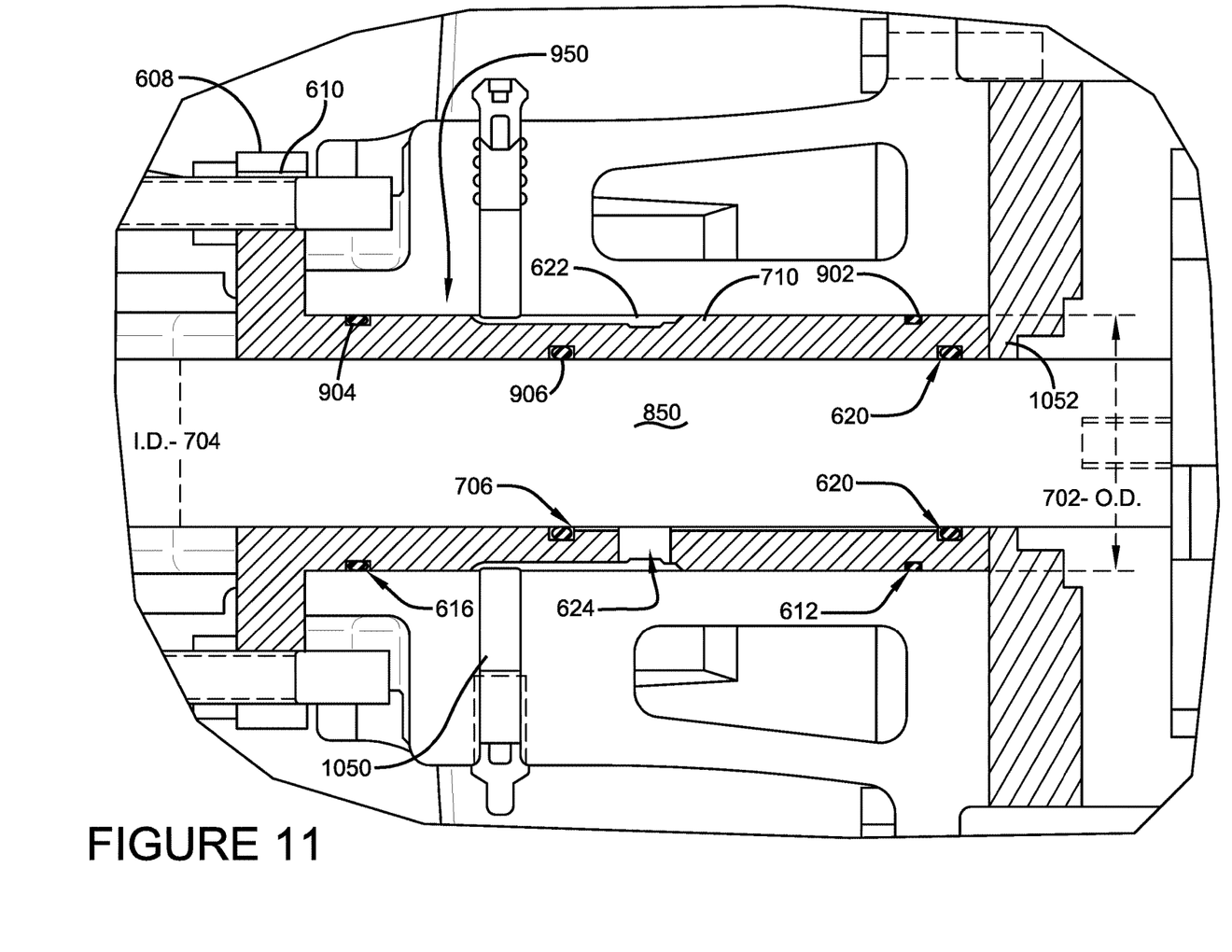
FIG. 11 is a component diagram illustrating a close up of a cut-away view of an example implementation of a pump where one or more portion of one or more devices described herein may be implemented.

As an example, as illustrated in FIGS. 9-11, the plurality of O-rings 902, 904, 906, 908 disposed in their respective gasket channels 612, 616, 706, 620, can not only facilitate the slip-fit of the tubular portion 602 on the shaft 850 in the packing box 950, but can also mitigate leakage of fluid. For example, gaskets 906 and 908 may facilitate containment of lubricant 1050 between the shaft 850 and the inner surface 618 of the tubular portion 602 (e.g., the bearing surface); and may also mitigate leakage of pumped fluid along the inner surface 618 of the tubular portion 602 toward the proximal end 606. As another example, the gaskets 902 and 904 may facilitate containment of lubricant 1050 between the external surface 614 of the tubular portion 602 and the wall of the pump shaft packing box; and may further mitigate leakage of pumped fluid along the external surface 614 of the tubular portion 602 toward the proximal end 606. As another example, the proximal gasket 906 can provide a secondary containment of liquid from the pumping chamber (e.g., 154 of FIG. 1) in the event that the distal gasket 908 were to fail.

The example device 600 can comprise a lubrication channel 622 that is configured to operably receive lubricant. In this implementation, the lubrication channel 622 can be disposed around the external surface 614 of the tubular portion 602, between the first gasket channel 612 and the second gasket channel 616. Further, the example device 600 can comprise a lubrication port 624 that is configured to operably transport lubricant 1050 between the lubrication channel 622 and the interior 618 of the tubular portion 602. In this implementation, the lubrication port 624 can be disposed through a wall 702 of the tubular portion 602, between the lubrication channel 622 and the interior 618 of the tubular portion 602. In this way, for example, an external lubrication supply can be fluidly provided to the lubrication channel 622, which, in turn, fluidly provides the lubricant 1050 to the interior 618 of the tubular portion 602, by way of the lubrication port 624. The lubricant 1050, for example, can be used to operably lubricate a bearing surface between the interior 618 of the tubular portion 602 and the pump shaft 850; and may also operably provide lubrication for the dynamic seals between the inner gaskets 906, 908 and the rotating pump shaft 850.

In one implementation, the example device 600 can comprise a seal removal component 626 that is disposed on the flange 608. The seal removal component 626 can be configured to facilitate removal of the device 600 from the pump shaft packing box 950. For example, the seal removal component 626 can comprise an access opening that allows a pulling tool to engage with the flange 608, to pull the example device 600 from the pump shaft packing box 950. As another example, the seal removal component 626 can comprise a threaded portion to further facilitate removal of the example device 600. For example, the access opening of the seal removal component 626 may comprise internal threads that allows for engagement with an external threaded component. In on example, jack screws may be threaded into the seal removal component 626 to facilitate removal of the example device 600. As another example, a pulling tool can be coupled with the jack screws to provide for easy removal of the example device 600.

In one aspect, a pump can be devised that provides for improved sealing of the pump shaft of the pump, and ease of maintenance of the pump seal. In this aspect, in one implementation, as illustrated in FIGS. 1-5, the pump 50 can comprise a pump shaft 152 that rotates. For example, the rotation can be provided by a motor that is coupled to the shaft by way of a pump motor coupler 162. Further, the pump 50 can comprise a pump rotor that is disposed in a pump chamber 154. The pump rotor 164 can be operably coupled with the pump shaft 152, and can be configured to move fluid as a result of the rotation of the shaft 152. The pump 50 can also comprise a shaft casing 150 that is disposed around the pump shaft 152 to hold fluid seal system 100.

In this aspect, in one implementation, the pump 50 can comprise a fluid seal component 100 that is disposed between the pump shaft 152 and the shaft casing 150 to mitigate fluid leakage from the pump chamber 154. The fluid seal component 100 can comprise a one-piece, combination packing gland and bushing component 102 that comprises a proximal end 104 proximate the pump motor coupler 162, and a distal end 106 distal from the motor coupler 162. The packing gland and bushing component 102 can comprise a packing gland portion 108 at the proximal end 104. The gland portion 108 can comprise two fastener couplers 302, that are respectively configured to receive a compression fastener 158 to facilitate compression of packing material 112.

The packing gland and bushing component 102 can also comprise a bushing portion 110 disposed at the distal end 106 that provides a bearing surface 114 for the rotating shaft 152. Further, the packing gland and bushing component 102 can comprise an inner gasket channel 116 that is disposed at a proximal end 104 of the interior 308 of the bushing portion 110. Additionally, the packing gland and bushing component 102 can comprise an inner gasket 208 that is disposed in the inner gasket channel 116 between the inside 308 of the bushing portion 110 and the rotating shaft 152. The inner gasket 208 can be configured to mitigate leakage of a lubricant from the inside of the bushing portion 110. In one implementation, the pump 50 can comprise packing material 112 that is disposed in the shaft casing 150 at the distal end 106 of the packing gland and bushing component 102. The packing material 112 can be subjected to compression force provided by the packing gland and bushing component 102, to mitigate leakage of fluid from the pumping chamber 154.

In one implementation, in this aspect, the packing gland and bushing component 102 can comprise an outer gasket channel 118 that is disposed proximate the proximal end 104 of the bushing portion 110. The outer gasket channel 118 can be used to hold a gasket between the outside of the bushing portion 204 and a wall of the shaft casing 156. As an example, the outer gasket channel 118 can hold an outer gasket 210, such as an O-ring.

Further, the packing gland and bushing component 102 can comprise a lubricant channel 202 that is configured to operably receive bushing lubricant 160. In this implementation, the lubricant channel 202 can be disposed around the external surface 204 of the bushing portion 110 at a location that is distally from the inner gasket channel 116. Further, a lubricant port 206 can be configure to operably transport lubricant 160 from the lubricant channel 202 to the interior 308 of the bushing portion 110, such as to the bearing surface 114. The lubricant port 206 can be disposed through a wall 306 of the bushing portion 110 between the lubricant channel 202 and the interior 308 of the bushing portion 110.

In one implementation, in this aspect, the example 50 can comprise a threaded packing gland and bushing removal component 304 that is disposed on the packing gland portion 108. The threaded packing gland and bushing removal component 304 can be configured to facilitate removal of the packing gland and bushing component removal component from the pump shaft casing. For example, a pulling tool or jack screws, may be coupled with the packing gland and bushing removal component 304 for easy removal of the packing gland and bushing component 102 from the shaft casing 150.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A packing device for sealing a rotating pump shaft, comprising:
a one-piece, combination packing gland and bushing component comprising a tube-shaped body having an outer diameter that is sized and configured to operably seat in a packing box of a rotating pump shaft casing of a target pump, and having an inner diameter to operably receive a rotating pump shaft of the target pump, the packing gland and bushing component further comprising a proximal end and a distal end the packing gland and bushing component further comprising:
a packing gland section at the proximal end and comprising a flange that has a diameter wider than a diameter of the packing box, the flange configured to operably receive one or more fasteners to operably fasten the combination packing gland and bushing component in the shaft casing;
a bushing portion comprising a rotating pump shaft inner bearing surface disposed at the distal end configured to operably provide a bearing surface for the rotating pump shaft;
a first inner gasket channel disposed at or near the proximal end of the combination packing gland and bushing component, the first inner gasket channel sized and configured to operably hold a first dynamic inner gasket against the rotating shaft of the target pump; and
a second inner gasket channel at or near the distal end of the bushing section, the second inner gasket channel configured and sized to operably hold a second dynamic inner gasket against the rotating pump shaft of the target pump.

2. The device of claim 1, the bushing portion comprising a first outer gasket channel at the proximal end of the bushing portion, the first outer gasket channel configured and sized to operably hold a first static outer gasket against an inner wall of the packing box of the target pump.

3. The device of claim 1, comprising packing material disposed at the distal end of, and in contact with, the bushing section, the packing material operably subjected to compression force provided by the packing gland and bushing component.

4. The device of claim 2, wherein the bushing section comprises a second outer gasket channel at the distal end of the bushing section, the second outer gasket channel configured and sized to operably hold a second static outer gasket against the inner wall of the packing box of the target pump.

5. The device of claim 1, wherein the bushing section comprises an outer lubricant channel disposed circumferentially around an external surface of the bushing section, distally from the first inner gasket channel.

6. The device of claim 4, wherein the packing gland and bushing component comprises a lubricant port disposed through a wall of the bushing section providing a fluid connection between an external surface of the bushing section and an interior of the bushing section.

7. The device of claim 6, the bushing section comprising an inner lubricant channel disposed longitudinally along the inner surface of the bushing section, and fluidly coupled with the lubricant port.

8. The device of claim 3, wherein the flange of the packing gland section comprises two fastener openings in which a fasteners is respectively disposed to provide the compression of the packing material.

9. The device of claim 1, wherein the packing gland and bushing component comprises a threaded cavity disposed on an outer face of the flange sized and configured to selectably receive a removal tool that facilitates removal of the packing gland and bushing component from the pump shaft casing.

10. A device for sealing a rotating pump shaft of a target rotating pump, comprising:
  a tubular portion comprising a body sized and configured to be operably disposed in a pump shaft packing box of the target rotating pump, with a rotating pump shaft from the target rotating pump disposed therethrough, comprising:
    a distal end;
    a proximal end;
    an external diameter sized to operably be seated inside an inner wall of the pump shaft packing box of the target rotating pump; and
    an internal diameter sized to operably receive the rotating pump shaft of the target rotating pump;
  a flange fixedly disposed at the proximal end of the tubular portion, the flange comprising two fastener couplers, respectively to operably receive a fastener;
  a first inner gasket channel disposed around an internal surface of tubular portion proximate the proximal end, configured to operably hold a first dynamic inner gasket against the rotating pump shaft of the target rotating pump;
  a first outer gasket channel disposed around an external surface of the tubular portion proximate the proximal end, the first outer gasket channel sized and configured to operably hold a first static outer gasket against the inner wall of the pump shaft packing box of the target rotating pump;
  a second outer gasket channel disposed around the external surface of the tubular portion distally from the first outer gasket channel, the second outer gasket channel sized and configured to operably holding a second static outer gasket against the inner wall of the pump shaft packing box of the target rotating pump; and
  an external lubrication channel to operably receive lubricant, the external lubrication channel disposed around the external surface of the tubular portion between the first outer gasket channel and the second outer gasket channel.

11. The device of claim 10, comprising a lubrication port to operably transport a fluid between the external surface of the tubular portion and an interior of the tubular portion, the lubrication port disposed through a wall of the tubular portion.

12. The device of claim 11, the tubular portion comprising an inner lubricant channel disposed longitudinally along an interior of the bushing section, and fluidly coupled with the lubricant port.

13. The device of claim 10, further comprising a second inner gasket channel disposed around the internal surface of tubular portion proximate the proximal end, the second inner gasket channel configured and sized to operably hold a second dynamic inner gasket against rotating pump shaft of the target rotating pump.

14. The device of claim 10, comprising a threaded seal removal cavity disposed on the flange, to facilitate removal of the device from the pump shaft packing box.

15. A pump shaft fluid sealing device for a rotating pump, comprising:
  a one-piece, combination packing gland and bushing component comprising a proximal end, and a distal end, the packing gland and bushing component comprising a tubular body having an outer diameter sized and configured to operably seat inside a shaft casing of the rotating pump, and an inner diameter sized and configured to operably receive a shaft of the rotating pump, the packing gland and bushing component comprising:
    a packing gland portion at the proximal end, the packing gland portion comprising a flange having a diameter that is wider than an opening to the shaft casing of the rotating pump, and is configured to operably receive one or more compression fasteners to operably provide compression of the combination packing gland and bushing component in the shaft casing of the rotating pump;
    a bushing portion at the distal end comprising wherein the inner diameter of the tubular body operably provides a bearing surface or the rotating shaft;
    a first gasket channel disposed near the proximal end of the combination packing gland and bushing component; and
    a first outer gasket channel disposed at a proximal end of an exterior of the bushing portion;
  a first dynamic inner gasket disposed in the first inner gasket channel sized to operably provide a dynamic seal between the combination packing gland and bushing component and the shaft;
  a first static outer gasket disposed in the first outer gasket channel sized to operably provide a static seal between the exterior of the bushing portion and the shaft casing;
  a second outer gasket channel disposed distally from the first outer gasket channel on the bushing portion, the second outer gasket channel sized and configured to operably holding a second static outer gasket between the outside of the bushing portion and the shaft casing; and
  a second inner gasket channel at the distal end of the combination packing gland and bushing component, the second inner gasket channel sized and configured to operably hold a second dynamic inner gasket between the interior surface of the combination packing gland and bushing component and the operably rotating shaft.

* * * * *